(12) United States Patent
Welch et al.

(10) Patent No.: US 6,826,270 B1
(45) Date of Patent: Nov. 30, 2004

(54) CALLING NAME AND CUSTOMIZATION IN A TELECOMMUNICATIONS ENVIRONMENT

(75) Inventors: James M. Welch, Wake Forest, NC (US); Janet L. Catts, Cary, NC (US); Aleeha R. Travis, Wake Forest, NC (US); Richard J. Wood, Holly Springs, NC (US)

(73) Assignee: Nortel Networks Limited, St. Laurent (CA)

( * ) Notice: Subject to any disclaimer, the term of this patent is extended or adjusted under 35 U.S.C. 154(b) by 779 days.

(21) Appl. No.: 09/696,125

(22) Filed: Oct. 25, 2000

(51) Int. Cl.[7] .......................... H04M 1/56; H04M 15/06
(52) U.S. Cl. ............................ 379/142.06; 379/142.15; 379/247
(58) Field of Search ................. 379/142.01, 142.05, 379/142.06, 142.17, 242, 245, 247

(56) References Cited

U.S. PATENT DOCUMENTS

| | | | | |
|---|---|---|---|---|
| 5,784,444 A | * | 7/1998 | Snyder et al. | 379/142.01 |
| 5,864,612 A | * | 1/1999 | Strauss et al. | 379/142.03 |
| 6,192,116 B1 | * | 2/2001 | Mayak | 379/142.08 |
| 6,310,944 B1 | * | 10/2001 | Brisebois et al. | 379/142.01 |
| 6,343,120 B1 | * | 1/2002 | Rhodes | 379/142.01 |
| 6,397,059 B1 | * | 5/2002 | Vance et al. | 455/415 |
| 6,449,351 B1 | * | 9/2002 | Moss et al. | 379/142.09 |
| 6,662,006 B2 | * | 12/2003 | Glass | 455/415 |
| 6,771,755 B1 | * | 8/2004 | Simpson | 379/142.04 |

* cited by examiner

*Primary Examiner*—Binh Tieu
(74) *Attorney, Agent, or Firm*—Winthrow & Terranova, PLLC

(57) ABSTRACT

Name customization features allow users to customize calling name information provided to a telecommunications network for calls placed from their subscriber lines. A local exchange switch provides calling party identification information for an associated subscriber line to the telecommunications network. If a custom name is desired for a given call, the local exchange switch changes, if necessary, a name value in the calling party identification information to the custom value. Subscribers can identify particular numbers and corresponding desired custom names, with the local exchange switch selecting the desired name when an identified number is called. Dialing feature codes from a handset or other device also may control custom name information. When appropriate, subscribers may customize calling number information as well. Preferably, screening methods prohibit subscribers from specifying disingenuous custom information. Custom information may be set any number of ways, including via telephone handsets, or by PC via a Web-based interface. Preferably, calling party identification information provided by the local exchange switch also includes fixed identification information to maintain accurate calling records within the telecommunications network.

50 Claims, 6 Drawing Sheets

CALLING NAME AND CUSTOMIZATION IN A TELECOMMUNICATIONS ENVIRONMENT

FIELD OF THE INVENTION

Figure 1:
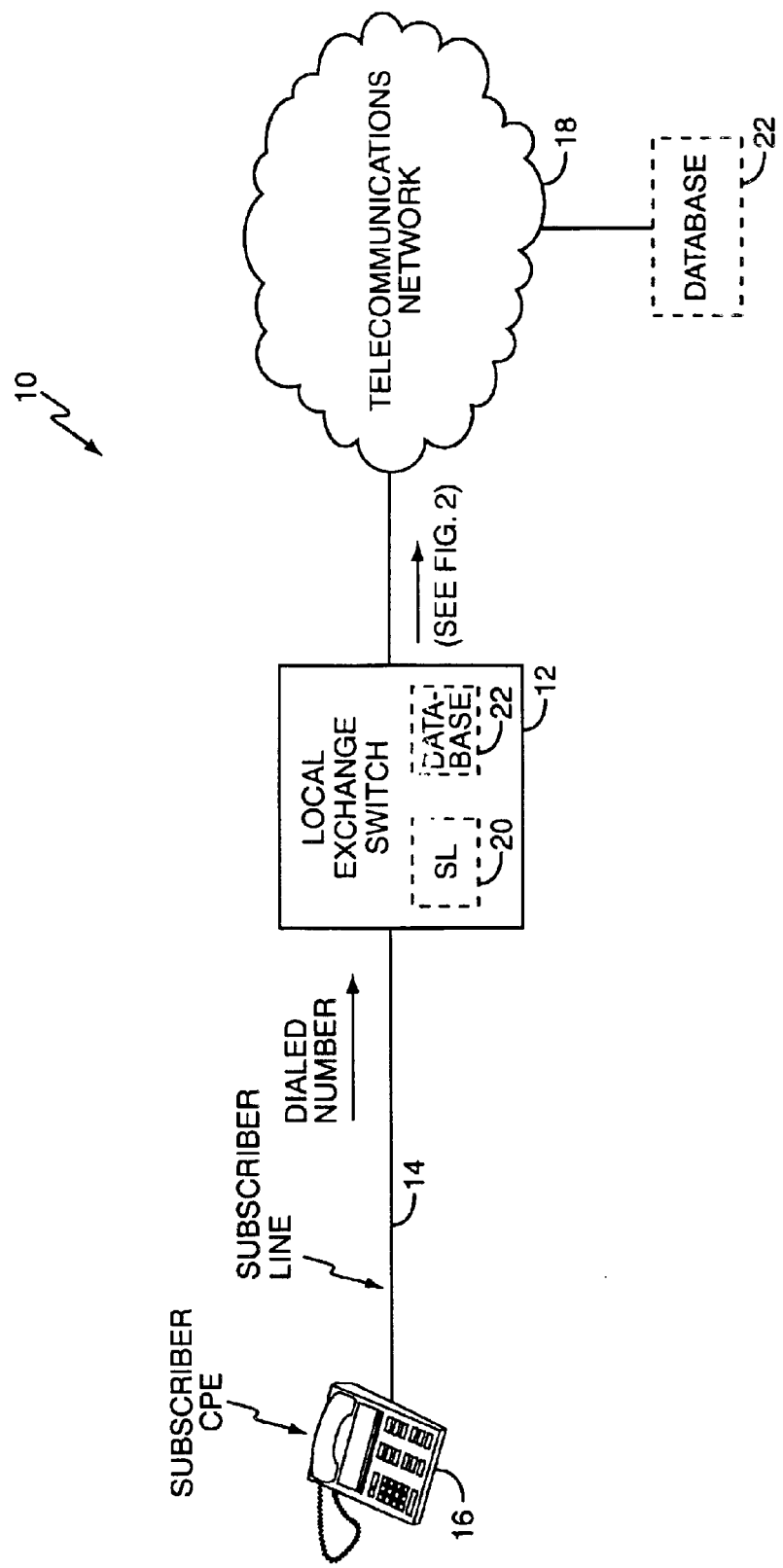

The present invention relates to enhanced telecommunications network features, and particularly relates to improving the usability of caller identification services.

BACKGROUND OF THE INVENTION

Modern telecommunications systems carry telecommunications traffic based on routing and control information that is exchanged between network elements comprising, for example, the Public Switched Telephone Network (PSTN). As these communication networks have evolved, so has the sophistication of their underlying signaling and control networks. Examples of telecommunications network signaling systems include Common Channel System Signaling No. 7 (SS7), an International Telecommunications Union Standard, and advanced intelligent networks (AIN) signaling. SS7, for example, provides a basis for call setup, management, and tear down. Of more concern to telecommunications system users, such signaling systems provide enhanced calling features.

Capitalizing on the network intelligence provided by SS7 or other types of network signaling implementations, telecommunication service providers are able to offer individual users the ability to interact with the telecommunications environment and control certain aspects of its operation. For example, individual users can selectively redial the number of the last incoming call, temporarily forward calls to a selected number, and with the right equipment, determine a caller's identity at a glance without having to pick up the phone. This last feature, that is the telecommunication network's ability to provide calling party information to the called party before the called party actually answers the phone, which has found broad everyday use.

Indeed, caller identification services have proven to be one of the most popular calling feature enhancements available. Generally referred to as "caller ID," calling identification services involve the delivery of a calling party's dialable number (DN), and optionally the calling party's name, to a called party. Oftentimes, the caller ID services are referred to as calling number delivery (CND) and calling name delivery (CNAM), respectively. With caller ID, information relating to the subscriber line originating the call travels, via some form of signaling system, through the telecommunications network, and is provided to the called party's premises equipment (e.g., telephone) by the Central Office or local exchange switch that serves the called party.

Delivery of the calling party's name is particularly useful in that it provides a more natural way for called parties to determine the identity of calling parties. Simply put, delivering the calling party's name obviates the need for the called party to mentally associate the incoming number with a particular name. Regardless of the type of network signaling system involved, the calling party identification information generally comes from some form of subscriber database, such as directory listing information. Thus, the name associated with a given calling subscriber's line by the telecommunications service provider is usually the name delivered to parties called by that given subscriber. This CNAM information is fixed in the sense that the telecommunications network providing the CNAM information for a given calling subscriber does not change or alter the information, providing the same name information for each call placed through a given subscriber line.

Limitations of existing CNAM delivery options are apparent. For example, a single telephone line is oftentimes registered to only one or two subscribers, but is associated with multiple users. A telephone serving a college dormitory room represents a common example of this type of situation. In the dormitory room scenario, each roommate likely calls a different group of friends and associates from the same telephone, leaving whatever CNAM information that is provided to parties called from that phone of questionable value, since the subscriber name associated with the telephone is fixed regardless of who is actually placing the call. Other examples, such as a residential service telephone shared by multiple family members, highlight essentially the same problem with existing CNAM delivery systems.

Even when the calling party is the subscriber associated with the phone line by the telecommunications service provider, the subscriber may desire the flexibility to change CNAM information depending upon whom he or she is calling. This desire is easily understood by contrasting the CNAM information appropriate for a business or formal call versus the information appropriate for a call placed to a friend or family member.

Accordingly, there remains a need for improvements to caller identification services that allow individual telephone users to adjust the calling name information provided to call recipients. Ideally, these improvements would include provisions for insuring that such custom or programmable calling name information capability is used responsibly and only in appropriate contexts.

SUMMARY OF THE INVENTION

The present invention enables the delivery of customizable calling party identification information within a telecommunications network. Calling party information delivered to the telecommunications network for calls placed from the subscriber line can be changed depending upon the number dialed, or can be set to a persistent desired value, which can later be changed again. In one embodiment, one or more lists (screen lists) of dialable numbers are identified in association with the subscriber line, with each of the lists being associated with a desired calling name. A call placed to any number appearing in one of the lists causes the calling party name information to be set to the corresponding desired value. Feature codes, as can be activated by dialing special numeric codes using customer premises equipment (CPE) associated with the subscriber line, may also be used to select and set the desired calling name for a single call, or for all calls until changed again.

When screen lists are used, the local exchange switch preferably has access to the screen lists associated with the subscriber line. Thus, the local exchange switch determines if a number dialed through the subscriber line is one for which calling party name customization is desired. If so, the local exchange switch may access locally or remotely stored name information to get the particular custom name desired for delivery in association with calls placed to the particular number dialed. The name information may be part of a larger subscriber database and can be included in the local exchange switch, or accessed remotely through the telecommunications network, using, for example, SS7 or AIN signaling protocols. Alternatively, the local exchange switch may have some other type of communications link with the database.

In one embodiment, the local exchange switch receives a defined numeric code from the CPE associated with the subscriber line, and this causes the local exchange switch to use a custom name value. The custom name value may be used just for that call, or may be used until changed or reset. The feature code may provide selection information such that the local exchange switch can determine which one of a number of predefined names are desired for use with the subscriber line. In this scenario, the predefined custom names are preferably stored data within the local exchange switch, or are accessible to the local exchange switch via the telecommunications network. Alternatively, the CPE may provide custom name information in association with the feature code, such that the local exchange switch receives not only the activation command, but the calling name custom value from the CPE as well. If the CPE provides the custom name information, it is preferable that the CPE have the ability to receive one or more custom names as input by a user of the CPE.

The ability to program custom names through the CPE may be an intrinsic capability of the CPE, or may be enabled in the CPE based on interaction with the local exchange switch, such as when the CPE is ADSI-compliant, and an ADSI server is associated with the local exchange switch. The utility of custom name programmability is useful in the context of both feature code-based and screen list-based custom name editing. The present invention contemplates a variety of ways for allowing users associated with the subscriber line to define desired custom name values. These methods include programming via the CPE, using visual menus if the CPE has a data display, or otherwise through voice menu systems. Other methods are available and include allowing subscribers to set custom name information by using PCs or other Internet access appliances to gain access to a Web server having custom name editing capabilities. Manual data entry may also be used to simply update stored information relating to custom names based on information received from the subscriber.

The present invention also provides for screening custom name values to ensure that no subscribers attempt to configure their calling party name information inappropriately. Such screening is ideally done at the time that the desired custom name value is entered, which is typically in advance of any call that might trigger use of the custom name value. Screening may be done in the CPE, the local exchange switch, or in another processing system associated with the telecommunications network, or in any combination thereof. If necessary, screening may be done at the time of call processing during an active telecommunications call. However, this may have the disadvantage of adding additional call processing time.

The present invention also provides the ability to customize calling party number information in certain instances. While the potential to abuse this feature in a way that defeats the underlying value of calling party identification information is present, customizable number information may have significant value within a private exchange where it may be desirable to associate calls placed from different subscriber lines with a common number. There are other circumstances and instances where it may be desirable to allow users to adjust subscriber line calling number identification information. Other aspects and features of the present invention will become apparent to those ordinarily skilled in the art upon review of the following description of exemplary embodiments of the invention in conjunction with the accompanying figures.

BRIEF DESCRIPTION OF THE DRAWING FIGURES

FIG. 1 illustrates a simplified exemplary telecommunications system in which the present invention may be advantageously practiced.

Figure 2:
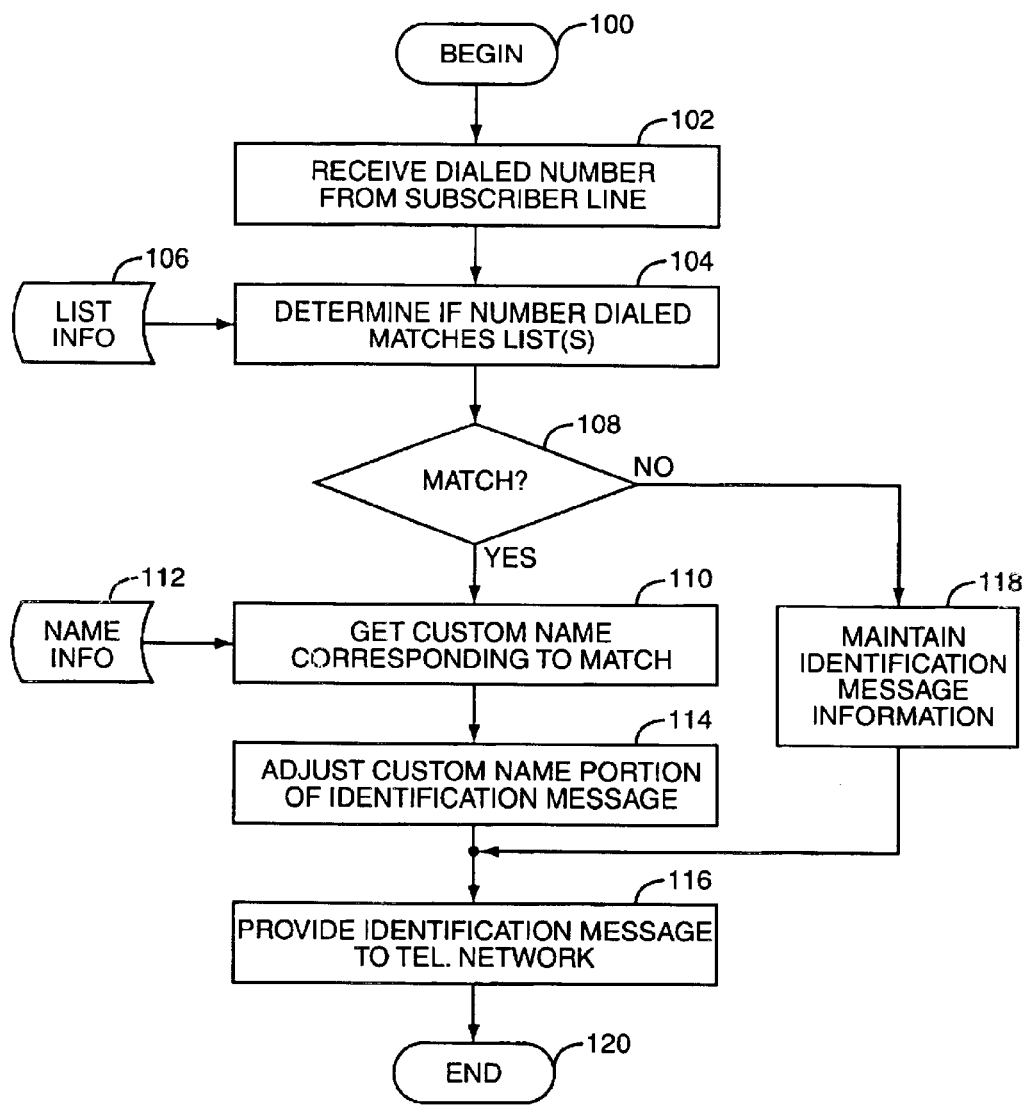

FIG. 2 provides simplified flow logic for list-based selective calling party identification information customization according to one embodiment of the present invention.

Figure 3:
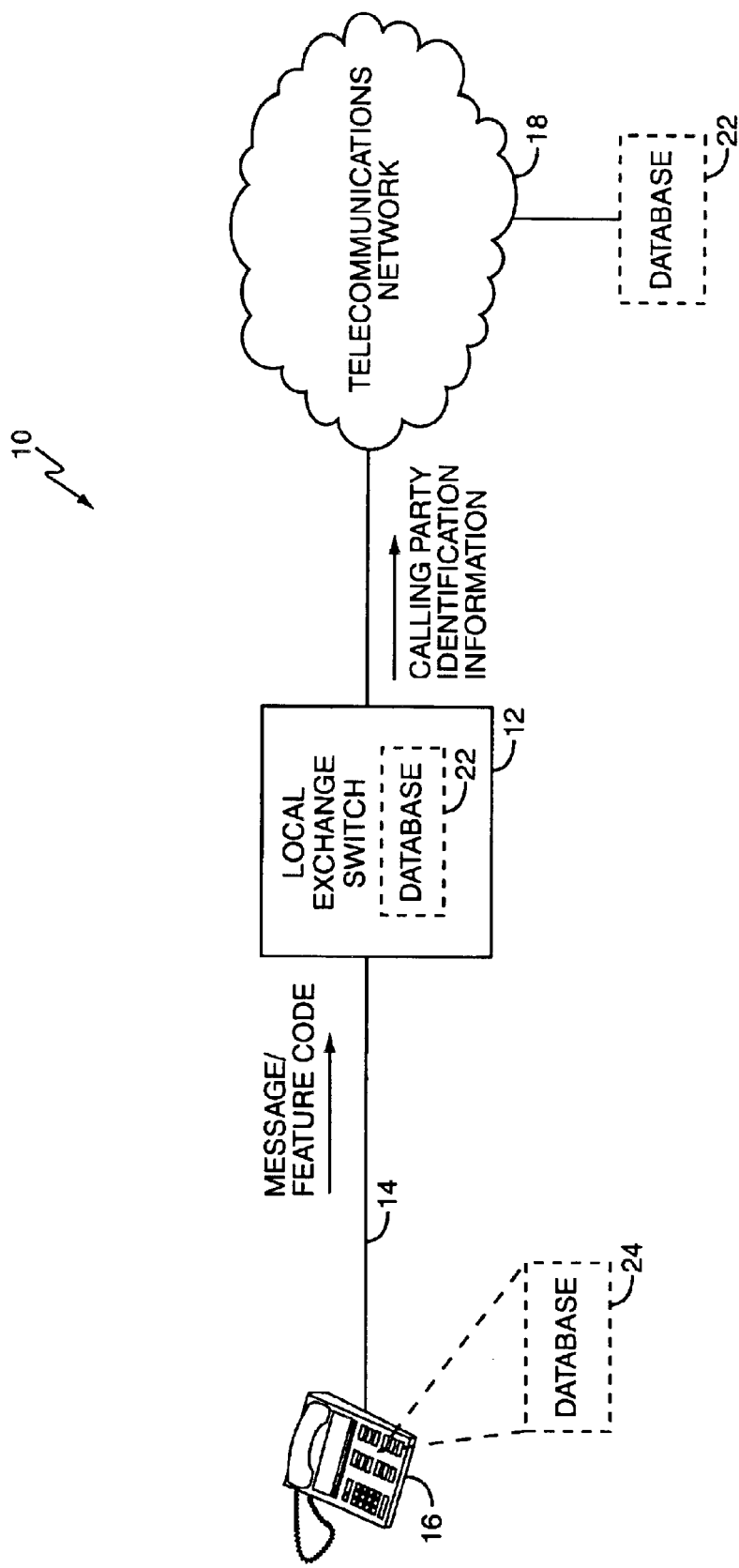

FIG. 3 illustrates an exemplary variation of the telecommunications system of FIG. 1.

Figure 4:
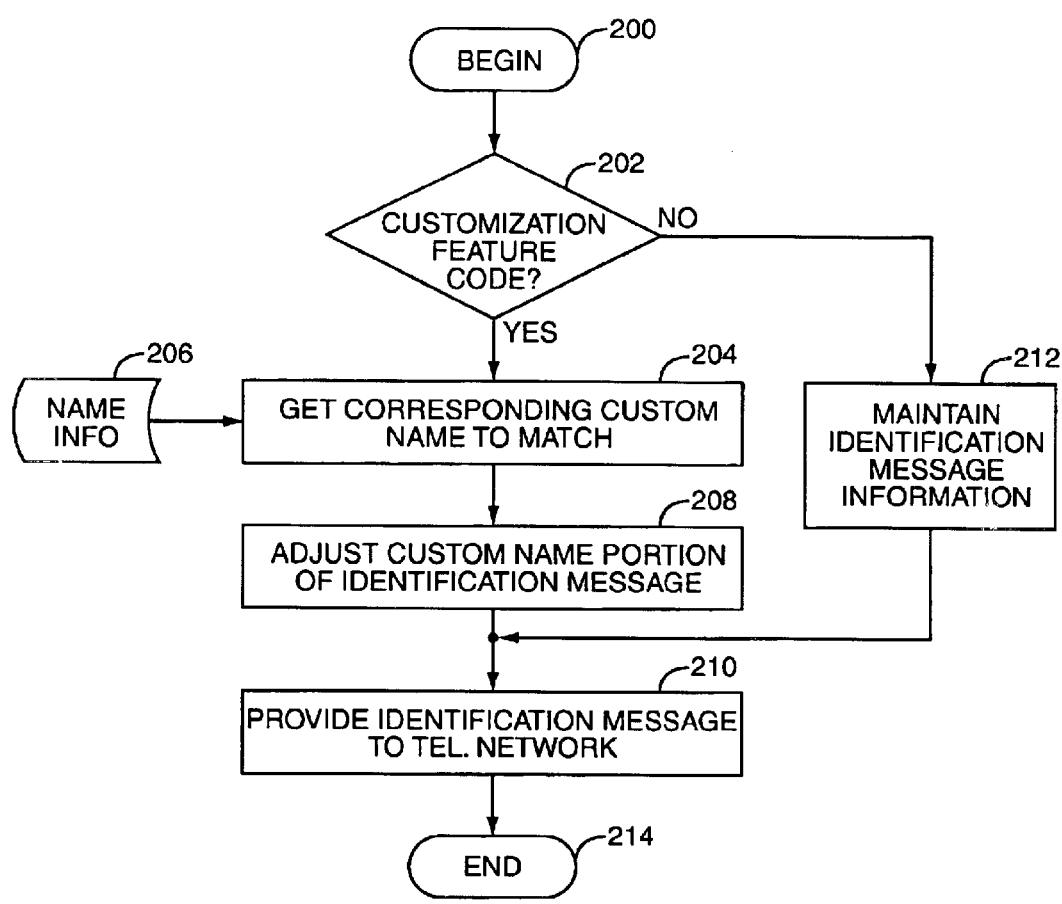

FIG. 4 provides simplified flow logic for feature-code-based custom calling party identification information selection according to one embodiment of the present invention.

Figure 5:
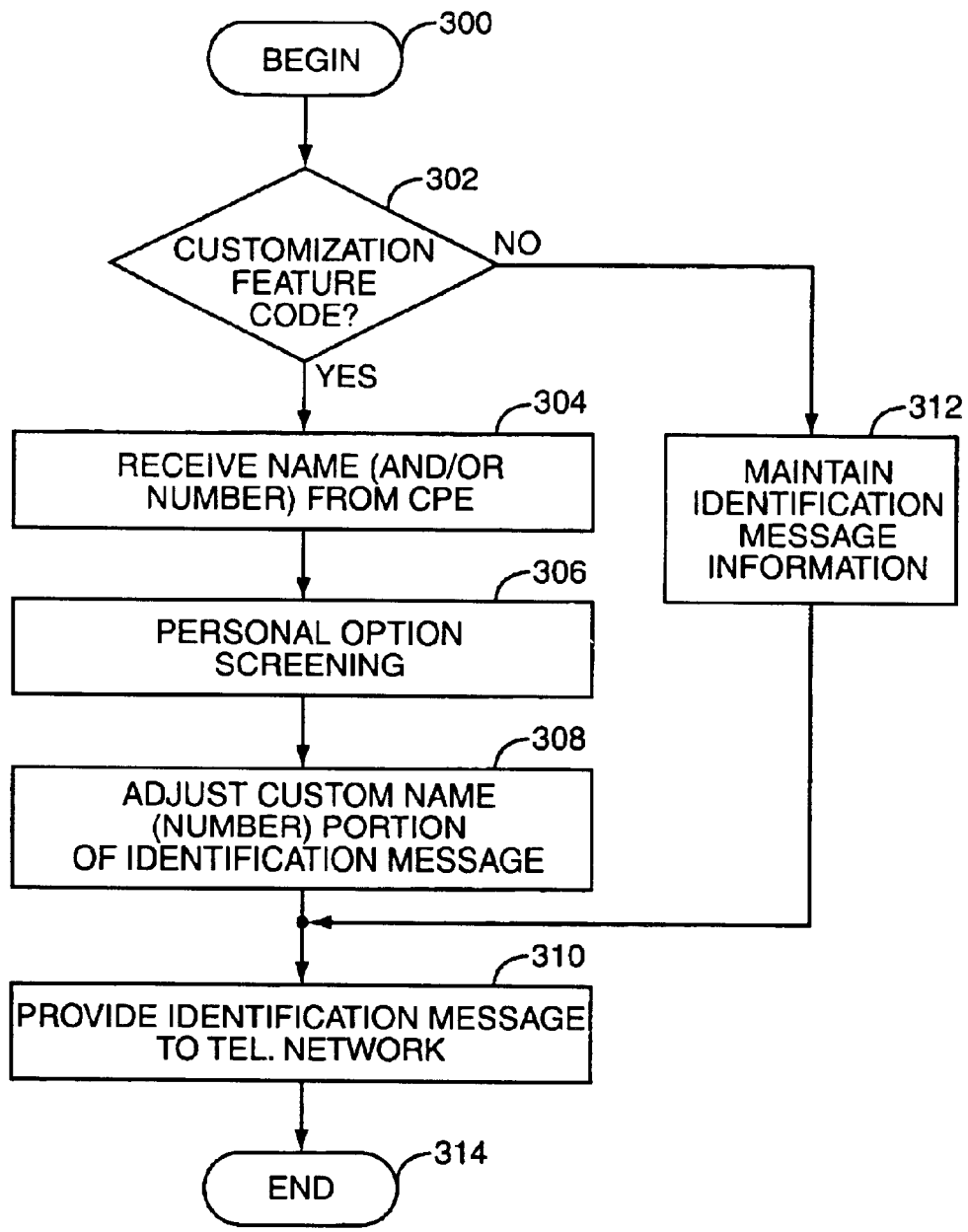

FIG. 5 provides simplified flow logic for an exemplary variation of the logic of FIG. 4.

Figure 6:
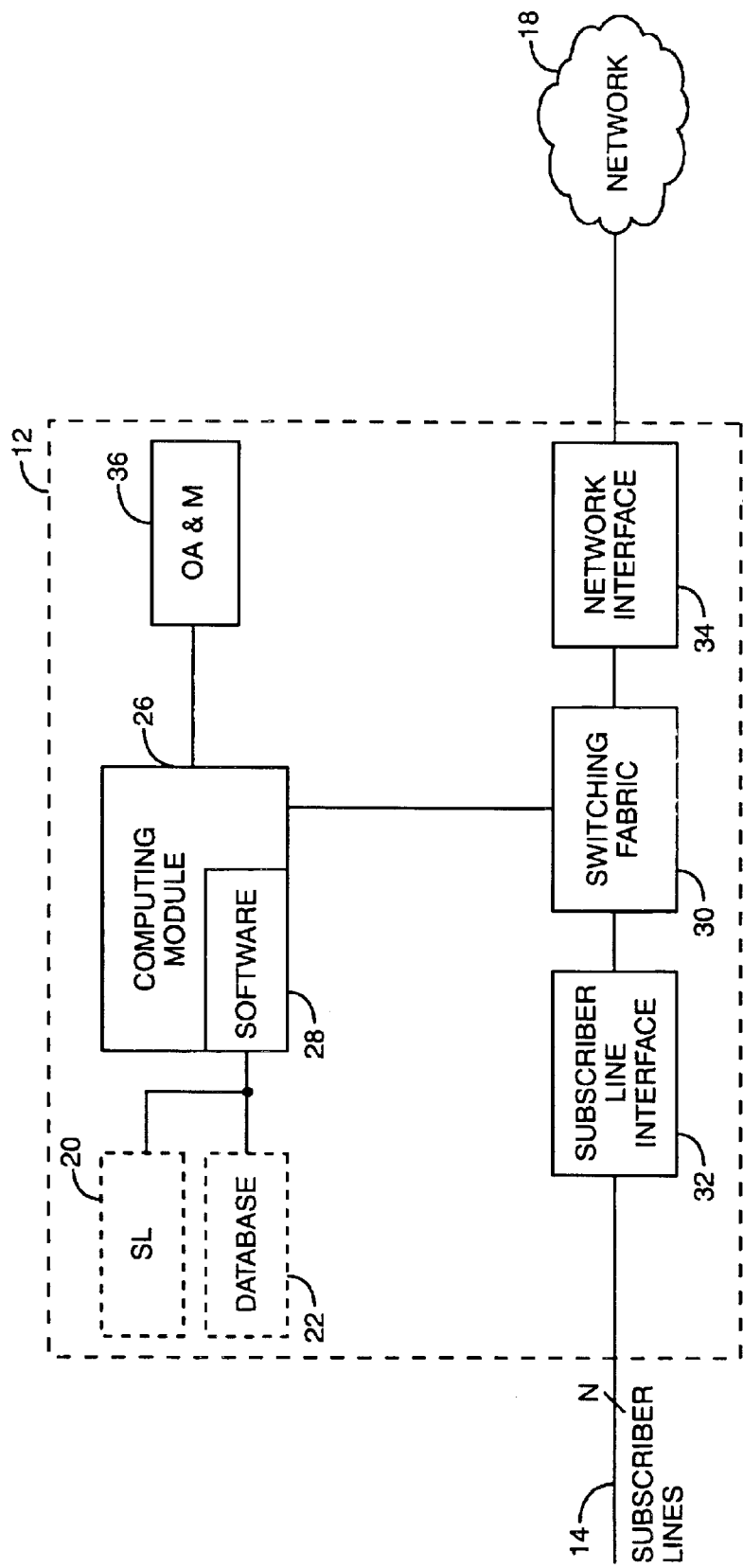

FIG. 6 provides a simplified illustration of an exemplary local exchange switch for use in the telecommunications systems of FIGS. 1 and 3.

DETAILED DESCRIPTION OF THE PREFERRED EMBODIMENTS

FIG. 1 illustrates a simplified telecommunications system 10 in which an exemplary embodiment of the present invention may be advantageously practiced. A local exchange switch 12, such as might be found in a telecommunications Central Office (CO), connects a subscriber line 14 and associated customer premises equipment (CPE) 16 to a telecommunications network 18. The local exchange switch 12 optionally includes stored data in the form of a screen list 20, and stored data in the form of a subscriber information database 22. Either or both the screen list 20 and subscriber information database 22 may reside remote from the local exchange switch 12 in association with the telecommunications network 18, however it is preferable to maintain at least the subscriber's screen list 20 in the local exchange switch 12. While not illustrated to preserve clarity, the local exchange switch 12 typically supports a large number of individual subscriber lines 14.

In support of caller identification services, the local exchange switch 12 provides the telecommunications network 18 with calling party identification information associated with the subscriber line 14 for calls placed via the CPE 16. Typically, this calling party identification information includes a fixed subscriber name value and a fixed dialable number value that have been assigned to the subscriber line 14 by a telecommunications service provider. With the present invention, individual subscribers can customize at least a portion of this calling party dedication information. In some embodiments, such customization is enabled using screen lists 20 and subscriber information databases 22.

FIG. 2 illustrates simplified logic associated with a screen list-based implementation for the network architecture of FIG. 1. While the simplified logic illustrated focuses on customization of calling name information, it should be understood that the logic shown may be additionally or alternatively applied to customization of calling number information. However, given the potential for abuse, it may be preferable to limit calling number customization to special circumstances. Circumstances appropriate for calling number customization are discussed below.

Processing begins (block 100) when a user dials a number using the CPE 16. The dialed number is received by the local exchange switch 12 through the subscriber line 14 (block 102). The local exchange switch 12 compares the dialed number with the appropriate entries in the screen list 20 (blocks 104 and 106). While a screen list 20 may contain other information, its utility with respect to the present invention derives from its inclusion of one or more lists of dialable numbers for which the subscriber associated with the subscriber line 14 desires customized calling party identification information.

For example, the subscriber may provide the telecommunications service provider associated with the local exchange switch 12 with five different dialable numbers (or groups of numbers) for which a different calling party name is desired. In this case, the screen list 20 would include entries for the five different dialable numbers (or groups of numbers), and could include the custom name information, although such information may be more conveniently stored in the subscriber information database 22. Thus, using the screen list 20, the local exchange switch 12 determines if the dialed number matches any numbers in the screen list 20 for which custom name information is defined.

If a match exists between the number dialed and a number stored in the screen list 20 (block 108), the local exchange switch 12 gets the custom name information corresponding to the matching stored number in the screen list 20 (blocks 110 and 112). As noted, the custom name information is preferably stored in the subscriber information database 22, which may be resident in the local exchange switch 12, or the local exchange switch 12 may remotely query the subscriber information database 22. Various techniques provide for remote querying, and include SS7-based network signaling and AIN-based signaling. These and other remote database access techniques will be readily understood by those skilled in the art.

Once the custom name information has been retrieved (block 110), the local exchange switch 12 adjusts the calling party identification information to reflect the custom name value (block 114). The local exchange switch 12 provides the telecommunications network 18 with a calling party identification message for the call being originated from the subscriber line 14 (block 116) and processing ends (block 120). Ideally, the calling party identification message includes a generic name parameter, along with fixed name and number parameters, and optionally includes a generic number parameter. In implementing calling party name customization, the local exchange switch 12 adjusts the generic name parameter to a desired value, while leaving the fixed name and number parameters unaltered. This allows the telecommunications network 18 to maintain accurate call records based on fixed information associated with the subscriber line 14, while allowing called parties to receive the custom name information contained in the generic name parameter.

If no match exists between the number dialed and the numbers contained in the screen list 20 (block 108), the local exchange switch 12 maintains either the current calling party identification message, or uses a default calling party identification message (block 118). The default calling party name will generally be the fixed name value included in the calling party identification message as explained above. Those skilled in the art will recognize opportunities exist for varying the logic associated with resetting the generic calling name parameter to a default value, a null value, or preserving its current custom setting.

With the present invention, callers can change their calling name as desired. For example, college roommates sharing a single telephone line may set the calling name when making a call in order to allow the receiving party to recognize who is calling. This is particularly useful the roommates that are not the subscribers on record at the telephone company. Alternatively, home based businesses sharing a telephone line for residential and business purposes can set the calling name for the business for business calls and set the calling name as the family name for personal calls.

FIG. 3 illustrates an exemplary variation of the simplified telecommunications system 10 introduced in FIG. 1. Rather than using a screen list 20 to determine when customized calling party dedication information is desired for a given call originated from the subscriber line 14, calling party identification information customization is controlled by feature codes and, optionally, name messages received from the CPE 16. Those skilled in the art will readily appreciate the use of other feature codes in existing telecommunications systems to enable enhanced calling services like automatic callback (e.g., dialing "*69"). Depending upon how supporting feature codes are implemented, calling party identification information customization may still use the subscriber information database 22, may use a private database 24 within the CPE 16, or may not rely on databases for storage of custom identification information at all.

While FIGS. 4 and 5 illustrate two of the numerous variations available with feature code control of custom calling party dedication information, it should be noted that feature code functionality may be combined with screen list-based calling party identification information customization for even greater flexibility in implementing The present invention. Further, FIGS. 4 and 5 are discussed In light of the architecture of FIG. 1 or 3. FIG. 4 illustrates an embodiment where feature codes received from the CPE 16 control calling party identification information customization.

Processing begins (block 200) with the local exchange switch 12 determining whether it has received a customization feature code in association with a call being placed from the CPE 16 connected to the subscriber line 14 (block 202). Preferably, the feature code is augmented with additional selection information sufficient to allow the local exchange switch 12 to identify a desired custom name value if multiple custom values have been defined for the subscriber line 14 (blocks 204 and 206). This might, for example entail receiving a feature code plus an additional numeric code corresponding to a specific custom name value stored in the subscriber information database 22.

Processing continues with the local exchange switch 12 adjusting the custom name portion of the calling party identification message to reflect the desired custom name information (block 208). The local exchange switch 12 then provides the calling party identification message to the telecommunications network 18 as part of its call completion operations (block 210) and processing ends (block 214). If the customization feature code is not received in association with the call (block 202), the local exchange switch 12 maintains the current or default identification message information (block 212).

FIG. 5 illustrates a variation of the simplified logic introduced in FIG. 4. Processing begins (block 300) with the local exchange switch 12 determining whether it has received a customization feature code from the CPE 16 connected with the subscriber line 14 (block 302). In contrast with the logic of FIG. 4, where the customization information was stored in the local exchange switch 12 or elsewhere in the telecommunications network 18, customization information in this embodiment is stored in the private database 24 and received from the CPE 16 (block 304). The customization information received from the CPE 16 may be a custom name, a custom number, or any combination thereof. Additionally, the feature codes may be used to indicate whether the customized settings should be persistent (i.e., used for subsequent calls), or simply applied to the current or next call. Software within the local exchange switch 12 may also provide functionality related to setting the persistence of customization settings for the calling party identification information in all embodiments of the present invention.

As alluded to earlier, the present invention may include customization of calling number information as well, but with consideration for the need to limit such customization to environments where its use is appropriate and not subject to abuse. In some environments, the local exchange switch 20 may serve as a private exchange for a group of subscriber lines 14. An example of this might be a company with a primary business number and a plurality of additional numbers associated with the phone system extensions assigned to individual employees. In these circumstances, it may be desirable to have the calling number identification information for outgoing calls placed from the individual extensions adjusted to the primary business number. Also, an employee working at a temporary extension may wish to temporarily preprogram the extension so that their name (and possibly, their normal extension number) is included in the calling party identification information sent for calls placed from the temporary extension. In the context of FIG. 5, an employee could simply pick up a given extension handset (not shown) and use a feature code to temporarily change the name and number identification information for that extension. Of course, the utility of these capabilities extend to environments other than just work environments, and may be combined with other embodiments of the present invention.

After the local exchange switch 12 receives the custom calling party identification information (name and/or number) from the CPE (block 304), the local exchange switch 12 optionally performs screening of the received information (block 306) to ensure that the custom information received is not inappropriate. This screening step may be employed in any of the embodiments of the present invention, and may take on a variety of forms, as those skilled in the art will readily appreciate. As noted, screening may be performed as a part of call processing, however this may undesirably increase the length of time required to complete a call.

Preferably, custom value screening is performed at the time of entry. Screening may be performed in the CPE 16, the local exchange 12, or associated processing systems in the telecommunications network 18, or in any combination thereof. Once optional screening is complete, the local exchange switch 12 adjusts the custom parameters in the calling party identification message for which customization is desired (block 308). The customized calling party identification message is provided to the telecommunications network 18 by the local exchange switch 12 (block 310) and processing ends (block 314). If no customization feature code was received by the local exchange switch 12 (block 302), the local exchange switch 12 maintains the current or default calling party identification message information (block 312), and processing ends (block 314).

A variety of methods exist for getting desired custom calling party identification information to the local exchange switch 12. By example, the information may come from data storage within or associated with local exchange switch 12, or may come from data storage accessible via the telecommunications network 18, or may come from the CPE 16. The co-pending application Ser. No. 09/643,510, entitled *System and Method of Controlling Calling Party Information Delivery* and commonly assigned with the instant application, relates to enhancing delivery control of calling party identification information and provides examples of how subscribers may access and edit data items such as screen lists 20 and subscriber information databases 22, and is incorporated herein by reference.

FIG. 6 illustrates the simplified architecture of an exemplary embodiment of the local exchange switch 12 discussed above. The architecture illustrated for the local exchange switch 12 is a simplified representation of a DMS-100 local exchange switch. The DMS-100 is manufactured by Nortel Networks Limited, having a business address at World Trade Center of Montreal, 380 St. Antoine Street West, Montreal, Quebec. A typical DMS-100 implementation includes a computing module 26 and supporting software 28. The software 28 includes program instructions supporting overall operation of the DMS-100, and provides functionality for enhanced calling services. The screen list 20 and the database 22 may be included in the DMS-100 in association with the computing module 26 and software 28. A "switching fabric" module 30 interfaces a plurality of subscriber lines 14 (telephony lines) to the network 18 via a subscriber line interface 32 and a network interface 34. The DMS-100 further includes an operations/administration & maintenance module 36.

In one embodiment, the DMS-100 includes storage elements configured to hold the screen list 20 and the database 22, in or associated with the computing module 26. In such configurations, the DMS-100 has local access to customized CID information for connected subscribers. In other configurations, the DMS-100 may access a remote database 22 for at least a portion of the custom CID information. The switching fabric module 30 may comprise logical and physical switches for interconnecting the subscriber lines 14 with the telecommunications network 18 through the subscriber line and network interfaces 32 and 34, respectively. The operations/maintenance. & administration module 36 provides an interface for select service and upgrade activities.

DMS-100 local switching systems support the Common Channel Signaling Interface No. 7, which is compatible with SS7 standards, and are available with a variety of software options supporting a variety of advanced calling features. While not critical to understanding the present invention, detailed operations for each of these elements are thoroughly explained in various service and product manuals available from Nortel Networks Corporation.

However, it should be understood that the features and capabilities imparted by the present invention are not dependent upon a particular organization or structure for the local exchange switch 12, the CPE 16, or the telecommunications network 18. It is sufficient that the telecommunications network 18 support the delivery of some form of caller identification information messages that may be selectively edited to reflect custom name and number values as defined by or in association with the individual subscribers for their respective subscriber lines.

Those skilled in the art will readily appreciate that the present invention permits substantial variation in terms of implementation. The foregoing discussion and accompanying drawings explain and illustrate exemplary embodiments of the present invention but should not be construed as limiting the scope of the present invention. In general, the present invention relates to allowing telecommunications system subscribers and users in general to define custom calling party identification information, and to control when and how such custom information is used. Thus, the scope of the present invention is limited only by the scope of the claims included herein, and the reasonable equivalents thereof.

What is claimed is:

1. A method of providing custom ceiling party identification (CID), the method comprising:

determining that customized CID information is desired by a call originator for a call originating from an originating end-point, wherein the customized CID information corresponds to a unique name selected by the call originator from a plurality of unique names and wherein determining comprising determining whether a number dialed for the call matches a stored number, said stored number designated by the call originator as being associated with the customized CID information; and providing the customized CID information in association with the call;

wherein a device receiving the call can receive the customized CID information.

2. The method of claim 1 wherein the step of providing comprises:

setting a CID message in accordance with the custom CID information; and transmitting the CID message as the customized CID information.

3. The method of claim 2, wherein the custom CID information includes at least one of a custom name value and a custom number value, and wherein the step of setting comprises setting at least one of a generic name portion and a generic number portion in the CID message to the custom name and number values, respectively.

4. The method of claim 3, further comprising maintaining fixed CID information in the CID message uniquely identifying the origination end-point for call record purposes.

5. The method of claim 1 wherein at least one list of stored numbers generated by the call-originator is associated with the origination end-point, each of the at least one list having corresponding custom CID information selected from the plurality of unique names, and wherein the step of providing comprises:

setting a CID message in accordance with the custom CID information corresponding to one of the at least one lists of stored numbers having a matching number with respect to the number dialed; and transmitting the CID message.

6. The method of claim 5, wherein the at least one list of stored numbers is stored in a local exchange switch associated with the origination end-point, and further comprising accessing a database to receive custom CID information if a match exists between a dialed number and a number in one of the at least one list of stored numbers.

7. The method of claim 6 wherein the step of accessing the database comprises accessing a local database associated with the local exchange switch.

8. The method of claim 6 wherein the step of accessing the database comprises accessing a remote database associated with a telecommunications network.

9. The method of claim 8 wherein the step of accessing the remote database comprises using SS7 signaling to access and query the remote database.

10. The method of claim 8 wherein the step of accessing the remote database comprises using advanced intelligent network signaling to access and query the remote database.

11. The method of claim 8 wherein the step of accessing the remote database comprises using Internet Protocol signaling to access and query the remote database through the Internet.

12. The method of claim 1 wherein the step of determining further comprises receiving a feature code indicating a desire for the customized CID information from customer premises equipment (CPE) associated with the origination end-point.

13. The method of claim 1 wherein the step of determining further comprises receiving a feature code indicating a desire for the customized CID information.

14. The method of claim 12 further comprising receiving custom CID information from the CPE in association with the feature code for use in the customized CID information provided in association with the call.

15. The method of claim 12, further comprising maintaining the customized CID information for subsequent calls originated from the origination end-point until receiving a new feature code bearing on use of changed customized CID information.

16. The method of claim 12 further comprising retrieving custom CID information from a database for use in the customized CID information in response to receiving the feature code.

17. A computer readable media comprising software for instructing a telecommunications computer system to:

determine that customized CID information is desired by a call originator for a call originating from an originating end-point, wherein the customized CID information corresponds to a unique name selected by the call originator from a plurality of unique names;

provide the customized CID information in association with the call;

receive dialed number information for the call; and determine whether the dialed number information matches stored number information, said stored number information comprising a number designated by the call originator as being associated with the customized CID information.

18. The computer readable media comprising software of claim 17 wherein the telecommunications computer system is a local exchange switch associated with the origination end-point and the stored number information is a screen list stored in the local exchange switch for the origination end-point, and further wherein the instruction to determine whether the dialed number information matches stored number information comprises instructions to compare the dialed number information with the stored number information in the screen list, wherein the stored number information includes at least one dialable number for winch customized CID information is desired.

19. The computer readable media comprising software of claim 17 wherein the telecommunications computer system is a local exchange switch associated with the origination end-point and the stored number information matching the number dialed has at least one of a corresponding stored custom name value and a corresponding stored custom number value, and further wherein the instruction to provide the customized CID information in association with the call comprises instructions to:

retrieve at least one of the corresponding stored custom name values and stored custom number values; and transmit the customized CID information including the at least one of the corresponding stored name and stored number values.

20. The computer readable media comprising software of claim 19 wherein the instruction to retrieve at least one of the corresponding stored custom name values and stored custom number values comprises instructions to access a remote database through an advanced intelligent network.

21. The computer readable media comprising software of claim 19 wherein the instruction to retrieve at least one of the corresponding stored name and stored number values comprises instructions to access a remote database through an SS7 network.

22. The computer readable media comprising software of claim 19 wherein the instruction to retrieve at least one of the corresponding stored name and stored number values comprises instructions to access a remote database through the Internet.

23. The computer readable media comprising software of claim 19 for further instructing the telecommunications computer system to:
support a user programming interface; and
receive dialable number information for storage as the stored number information from a user via the user programming interface.

24. The computer readable media comprising software of claim 23 for further instructing the telecommunications computer system to:
receive at least one of desired name and number values for storage as the corresponding stored custom name and number values.

25. The computer readable media comprising software of claim 19 for further instructing the telecommunications computer system to:
support a user programming interface via customer premises equipment (CPE) connected to the origination end-point; and
receive dialable number information for storage as the stored number information from a user via the user programming interface.

26. The computer readable media comprising software of claim 17 wherein the instruct on to determine that customized CID information is desired for a call originating from an origination end-point further comprises instructions to determine if a feature code corresponding to a desire for customized CID information is received in advance of the call.

27. The computer readable media comprising software of claim 26 for further instructing the telecommunications computer system to:
receive selection information in conjunction with the feature code; and
select at least one of a desired custom name value and a desired custom number value corresponding to the selection information for use in the customized CID information.

28. An apparatus facilitating provision of custom calling party identification (CID) comprising:
a means for selectively interconnecting a plurality of origination end-points in support of telecommunications functions based on dialable number information entered via individual ones of the plurality of origination end-points;
a means for determining that customized CID information is desired by a call originator for a call originating from a given one of the plurality of origination end-points, wherein the customized CID information corresponds to a unique name selected by the call originator from a plurality of unique names, wherein the means for determining that customized CID information is desired for a call originating from a given one of the plurality of origination end-points comprises a means for determining whether a number dialed for the call matches one in a predefined list of stored numbers, said stored numbers comprising a plurality of numbers designated by the call originator as being associated with the customized CID information:
a means for determining at least one custom value for use as at least a part of the customized CID information; and a means for transmitting the custom CID information in association with the call.

29. The apparatus of claim 28 wherein the means for determining at least one custom value for use as at least a part of the customized CID information comprises a means for retrieving the at least one custom value from a database.

30. The apparatus of claim 28 wherein the means for determining that customized CID information is desired for a call originating from a given one of the plurality of origination end-points further comprises a means for determining whether a feature code indicating a desire for the customized CID information is received in advance of the call.

31. The apparatus of claim 30 wherein the means for determining at least one custom value for use as at least a part of the customized CID information comprises a means for receiving at least one of a custom name value and a custom number value in association with the feature code received through the origination end-point.

32. The apparatus of claim 30 wherein selection information is received in association with the feature code and the means for determining at least one custom value for use as at least a part of the customized CID information comprises a means for accessing a database to retrieve the at least one custom value based on the selection information.

33. The apparatus of claim 32 wherein the means for accessing the database comprises a means for communicating with a remote database via an SS7 network.

34. The apparatus of claim 32 wherein the means for accessing the database comprises a means for communicating with a remote database via an advanced intelligent network.

35. The apparatus of claim 32 wherein the means for accessing the database comprises a means for communicating with a remote database via an internet.

36. A telecommunications local exchange switch comprising:
a first interface for connecting with a plurality of origination end-points;
a second interface for connecting with a telecommunications network;
a switching system operatively associated with the first and second interfaces for selectively interconnecting individual ones of the origination end-points, and for selectively connecting individual ones of the origination end-points with the telecommunications network; and
a controller for supporting overall operations of the telecommunications local exchange switch in accordance with program instructions and operating data;
said controller adapted to selectively provide customized CID information in association with calls originating from at least one of the plurality of origination end-points based on the program instructions and operating data, wherein the customized CID information corresponds to a unique name selected by the call originator from a plurality of unique names; and
said controller adapted to provide the customized CID information based on determining whether a number dialed in association with a call originating from the at least one origination end-point matches one in a predefined list of stared numbers, said stored numbers comprising numbers designed by the call originator as being associated with the customized CID information.

37. The telecommunications local exchange switch of claim 36 wherein the controller determines at least one custom value for the customized CID information based an retrieving the at least one custom value from a database associated with the telecommunications local exchange switch.

38. The telecommunications local exchange switch of claim 37 wherein the controller is further adapted to access the database via a SS7 network.

39. The telecommunications local exchange switch of claim 37 wherein the controller is further adapted to access the database via an internet.

40. The telecommunications local exchange switch of claim 37 wherein the controller in further adapted to access the database via an advanced intelligent network.

41. The telecommunications local exchange switch of claim 36 wherein the controller further determines that the customized CID information is desired for a call originating from a given one of the plurality of origination end-points based on determining whether a feature code indicating a desire for the customized CID information is received through the origination end-point in advance of the call.

42. The telecommunications local exchange switch of claim 41 wherein the controller determines at least one custom value for the customized CID information based on information received through a telephony line in association with the feature code.

43. The telecommunications local exchange switch of claim 41 wherein the controller determines at least one custom value for the customized CID information based on selection information received in association with the feature code that is used in accessing a database associated with the telecommunications local exchange switch to retrieve the at least one custom value.

44. A method of providing custom calling party identification (CID) information, the method comprising:
   determining that customized CID information is desired for a call originating from an originating end-point;
   comparing the customized caller CID information with inappropriate CID information; and
   providing the customized CID information in association with the call if the customized CID information does not match the inappropriate CID information;
   wherein a device receiving the call can receive the customized CID information.

45. A method of providing customized calling patty identification (CID) information to a called party, the method comprising:
   allowing callers associated with a single line subscription to generate a plurality of customized CIDs associated with the single line subscription wherein the callers designates the designated CIDs by a dialed number;
   allowing the callers to designate a designated CID from the plurality of customized CIDs, the designated CID selected to be used when a call is made from a telecommunications line associated with the single line subscription; and
   passing the designated CID to a call recipient.

46. The method of claim 45 wherein allowing callers to designate a designated CID from the plurality of customized CIDs further comprises designating through a feature code.

47. The method of claim 45 further comprising allowing the callers associated with the single line subscription to designate different lists of dialed numbers and associate different ones of the customized CIDs with the different lists such that when a number is dialed and a on a list, the customized CID associated with that list is provided to the call recipient.

48. The method of claim 45 wherein allowing callers associated with a single line subscription to generate a plurality of customized CIDs associated with the single line subscription comprises allowing customer to generate a plurality of customized CIDS through a packet based network.

49. The method of claim 45, further comprising screening each of the plurality of customized CIDs for appropriate material.

50. The method of claim 45 further comprising maintaining a record CID associated with the single line subscription such that regardless of the CID provided to the call recipient a service provider may bill the single line subscription appropriately.

* * * * *

UNITED STATES PATENT AND TRADEMARK OFFICE
CERTIFICATE OF CORRECTION

PATENT NO. : 6,826,270 B1 Page 1 of 1
APPLICATION NO. : 09/696125
DATED : November 30, 2004
INVENTOR(S) : Welch et al.

It is certified that error appears in the above-identified patent and that said Letters Patent is hereby corrected as shown below:

In column 8 at line 64, please change "ceiling party" to --calling party--.

Signed and Sealed this

Twelfth Day of September, 2006

JON W. DUDAS
*Director of the United States Patent and Trademark Office*